Sept. 26, 1972  J. BUISSIERE  3,694,320
PROCESS FOR STUDYING THE GROWTH AND PHYSIOLOGY OF
BACTERIA AND RECEPTACLE FOR CARRYING OUT
THIS PROCESS
Filed Nov. 18, 1969  2 Sheets-Sheet 1
FIG. 1
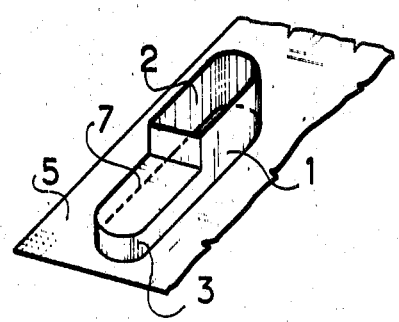
FIG. 2
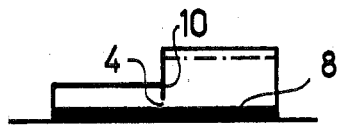
FIG. 3
FIG. 4
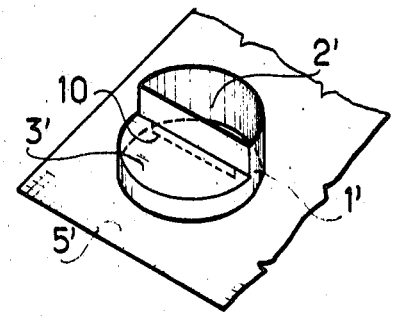
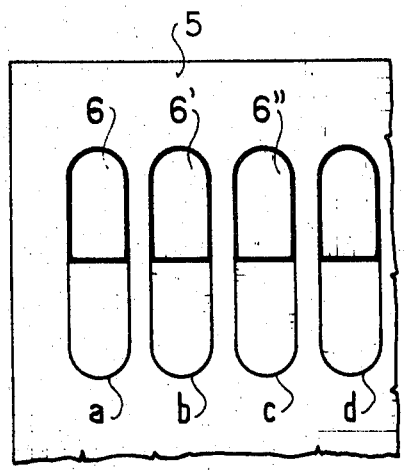
FIG. 5
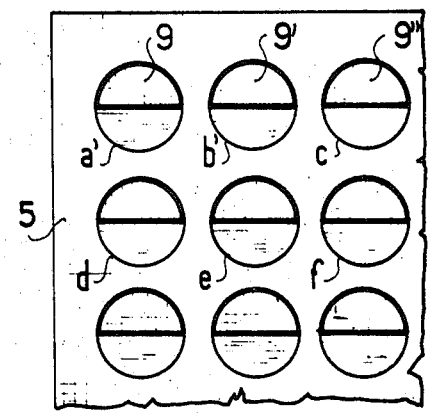

United States Patent Office 3,694,320
Patented Sept. 26, 1972

3,694,320
PROCESS FOR STUDYING THE GROWTH AND PHYSIOLOGY OF BACTERIA AND RECEPTACLE FOR CARRYING OUT THIS PROCESS
Jean Buissiere, Lyon, France, assignor to Compagnie Generale d'Automatisme, Paris, France
Filed Nov. 18, 1969, Ser. No. 877,751
Claims priority, application France, Nov. 22, 1968, 174,997
Int. Cl. C12b 1/00
U.S. Cl. 195—144                 4 Claims

ABSTRACT OF THE DISCLOSURE

Process for studying the growth and physiology of bacteria, according to which the development of bacteria in aerobic and anaerobic conditions are studied simultaneously, using the same receptacle comprising two communicating parts. Receptable for carrying out the process having a part clearly open to air, forming a cup, in which the bacteria develop in aerobiotic conditions, a covered part communicating with the base of the cup including a protuberance partially separating the two communicating parts and spaced so as to allow an opening between the two parts.

---

The present invention relates to the measurement of the growth of bacteria in the presence of well defined chemical products, and to that of the effects of this growth on given substances, in the presence or absence of air.

Devices are already known permitting study of the enzymatic activities of bacteria. These biochemical methods only study the bacterial enzymes and to do this employ bacteria which do not need to develope, even pulverised bacteria, the active principle then being the enzymatic chemical substance contained in the cells. These micromethods do not permit measurement of the bacterial development, an important characteristic useful for a more complete knowledge.

In fact, observation of the growth provides complementary information; for example, to know that among the bacteria which all possess a certain capacity for breaking down urea, certain need only urea for growth, others need different growth factors (vitamins, amino acids); moreover, certain of these bacteria grow in the absence of oxygen while others need the presence of atmospheric oxygen. Study of the growth thus provides more information than the enzymatic method.

The known enzymatic methods require, furthermore, a large number of bacteria to provide a sufficient quantity of enzymes, to detect rapidly and in good conditions the breaking down of the chemical products; consequently, they require preliminary preparation of cultures, from which stems a loss of time which can be several days, depending on the species of bacteria.

An object of the present invention is to define a process permitting the demonstration of the growth of bacteria using only a small number of bacteria, that is to say requiring no preliminary culture preparation.

Another object of the present invention is to demonstrate, at the same time as the growth of the bacteria their nutritional demands.

The enzymatic methods require special reagents, involving a specific recording method for almost each one of these reagents; on the contrary, the measurement of the growth is a single phenomenon which can be demonstrated with the aid of a single recording apparatus, whatever the number of chemical reagents used. To sum up, the advantages of the method of measuring the growth of bacteria are characterised with respect to biochemical methods by a greater amount of information obtained, and a particularly simple apparatus.

Methods of measuring bacterial growth are known.

These techniques usually employ two sorts of culture receptacle: Pétri dishes and test tubes, and employ two sorts of culture medium:

Liquid media and solid media which are fluid when heated, solidifying during cooling (gelatin).

Petri dishes are used particularly for the solid culture media, test tubes for the liquid media.

The bacteria which grow on the surface of a solid medium do so in the presence of atmospheric oxygen; their growth and physiology take place aerobically. Furthermore they grow on the surface in groups or "colonies."

Bacteria which are cultivated in a liquid medium do not form colonies and spread throughout the medium; those which find themselves at the surface are in aerobic conditions, those which develope far from the surface, in the depths of the tube, are in anaerobic conditions; they are not exposed to atmospheric oxygen. The physiology of the bacteria is completely modified depending on whether they grow aerobically or anaerobically.

The study of the developement of the bacteria must thus be made at the same time aerobically and anaerobically, in a liquid medium and on a solid medium. The apparatus generally used is of glass, bulky and relatively costly. Also, it demands the use of 100 to 150 cm.$^3$ of medium. Furthermore the apparatus must be recovered, and thus necessitates cleaning and maintenance work.

Assuming that one wishes to study the growth of bacteria subjected to the influence of 160 different chemical bodies, the experiment in this case requires 160 test tubes, plus 160 Pétri dishes for each basic bacterium, making unrealistic a simultaneous study of several tens of bacteria. According to the device the object of the invention, it is to be noted that 160 receptacles suffice, which, by their small dimensions, take up a space of only roughly 30 cm. by 12 cm.

Another object of the invention is to provide a device for the study of bacterial growth without requiring an apparatus which is heavy and expensive and which requires maintenance and cleaning is necessary.

The invention has for an object a process for the study of the physiology and growth of bacteria, characterised in that it includes the following operations:

in a plurality of identical transparent receptacles adapted to have an aerobic portion and an anaerobic portion, there are placed proportioned quantities of chemical substances chosen from the groups of substances serving to demonstrate bacterial growth, each receptacle containing a different substance;

there is introduced into each receptacle an identical quantity of a diluting liquid;

there is introduced into each receptacle an identical quantity of a liquid containing the bacteria in suspension;

the receptacles are placed in an incubator;

the turbidity of the medium in each portion of each receptacle is measured.

The invention equally has for an object a receptacle for carrying out the process, characterised in that it is formed of a transparent material and includes a first part open to the air and forming a cup, and a second and closed part communicating with the first part through an opening placed at the base of the latter.

The invention will be well understood from the description of different embodiments of the invention given hereafter with reference to the accompanying drawing, in which:

FIG. 1 shows a first form of construction of the receptacle according to the invention, seen in perspective.

FIG. 2 shows the same receptacle in longitudinal section.

FIG. 3 shows a series of these receptacles on a strip for continuous analysis.

FIG. 4 shows a variation of the device according to which the receptacle is circular.

FIG. 5 shows a plate comprising a large number of these receptacles for a series analysis.

Figure 6:
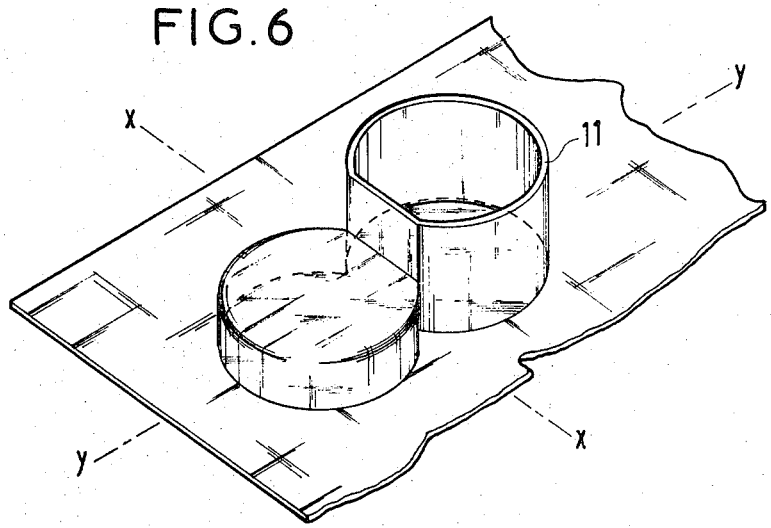
FIGS. 6 and 7 show in perspective two other embodiments of the receptacle of the invention.

Referring to FIG. 1, it is seen that the receptacle 1 is essentially composed of two parts: one part 2 open to the atmosphere and allowing abundant gaseous exchanges, and one part 3 whose surface is covered with a film of transparent plastic material preventing all exchange of gas with the external medium. This tubular receptacle 3 must be used in a horizontal position to reduce to a minimum gaseous exchanges between the tube 3 and the atmosphere.

These two receptacles have a common base, and communicate with one another by the passage 4 which is seen more clearly in referring to FIG. 2. This receptacle is constituted by a plate 5 of plastic material on which may be placed a sheet comprising a series of elements 6, 6', 6" (see FIG. 3) of transparent plastic material, representing the lateral walls of the receptacles as well as the top portion of the tube 3.

On the base of these two communicating receptacles 1 and 3, there is placed a layer 8 comprising the chemical reagent it is desired to study dispersed in a protective substance. This product may be placed in one or the other or both of the two receptacles 1 and 3 after manufacture, and stored with them.

The dimensions of this device are reduced by comparison with those of the Pétri dishes and tubes usually used in bacteriology.

They permit the study of a quantity of culture medium about 50 times less than those used in conventional methods. They are nevertheless sufficient for the handling of the device to be convenient and for the introduction of the reagents and bacteria to be made without difficulty, by means of Pasteur pipettes or syringes. The surfaces occupied by the cup 2 and the tube 3 are preferably identical, but may nevertheless be different.

They are sufficient for the observations to be made with the naked eye, as well as with the aid of recording apparatus.

The volume of liquid which can be contained in the cup 2 must be greater than that contained in the tube 3, preferably double the volume. In any case, the height of 50 liquid contained in the cup is always greater than the level of the liquid present in the tube, so that no gaseous exchange can take place between the tube 3 and the external medium.

By way of indication, the volume of the cup 2 filled to a depth of 4 mm. is about 0.45 cm.$^3$; the volume of the tube is 0.20 cm.$^3$. The total capacity of the receptacle is thus less than 1 cm.$^3$.

According to the embodiment of FIG. 4, the base of the assembly of receptacles 2 and 3 is circular; in order to reduce to a minimum gaseous exchanges between the tube 3' and the exterior, the area of the passage 4 is reduced in producing a constriction 10.

In this case it is noted that filling of the part 3' of the receptacle is easier than in the case shown in FIG. 1.

The materials used are chosen from among the chemically inert transparent plastic materials: polystyrene, polypropylene, polyvinyl. The base, which is not necessarily transparent, is made in one part and separately from the upper part comprising the lateral walls and covering part 7 of the receptacle 3.

This upper part is formed from a sheet of plastic material by any known process, vacuum moulding for example, and is welded or glued to the lower part 5.

The product obtained is kept sterile until it is used, in sealed envelopes, the whole thus being storable for several months.

In the case when the product is in the form of sheets comprising a series of receptacles such as shown in FIG. 3, and in FIG. 5, each of the receptacles carries a reference $a$, $b$, $c$, $d$; $a'$, $b'$, $c'$, $d'$; thus permitting identification of each of the reactions that will take place in these enclosures.

Figure 7:
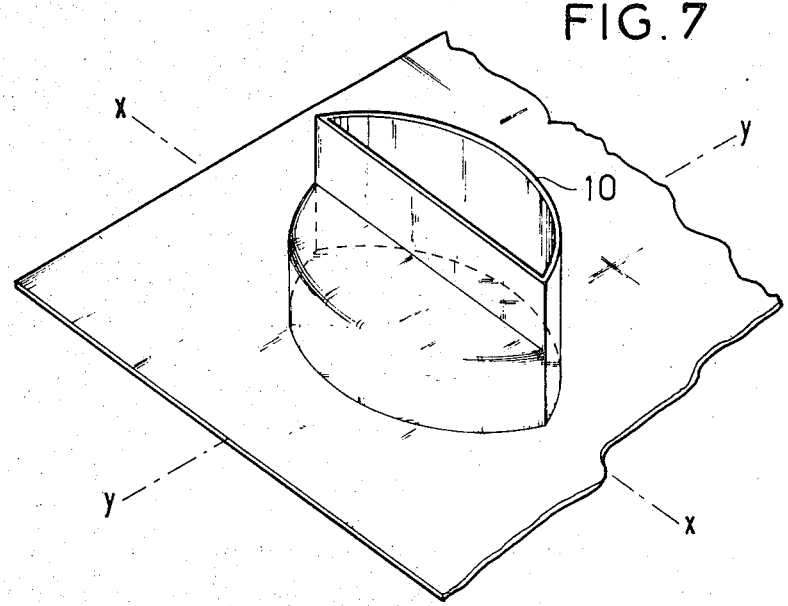

FIGS. 6 and 7 show two other embodiments of the receptacle. They differ from those shown in FIGS. 1 to 5 in that for the same volume to be filled, the area of the entry opening is increased.

In these embodiments, it is necessary to give the receptacle, for a given volume to be filled, the greatest possible transverse dimension so as to facilitate filling and avoid air bubbles. In practice, this involves giving the receptacle transverse dimensions (line $x$—$x$) as close as possible to the longitudinal dimensions (line $y$—$y$).

At the time of use of such receptacles, duirng a bacteriological analysis, the procedure is as follows:

(1) A certain area of the sheet containing the receptacles is selected, a precisely measured quantity of chemicals for demonstrating the bacterial growth having previously been placed in each receptacle. These chemicals are of high molecular weight, chemically inert, and soluble in the liquids commonly employed in bacteriology. These high molecular weight chemicals form an excipient or vehicle which dries to form a film containing and perserving the chemical reagents, and permit precise measurement of these reagents. At the time of use, these high molecular weight chemicals assure good dispersion of the reagents, even when the latter are themselves only slightly soluble. The active chemicals can be a series of amino acids, tryptophan, phenylamine or aniline, lysine, arginine.

The layer 8 shown in FIG. 2 shows the reagent and excipient after desiccation.

(2) Into each horizontally disposed receptacle there is introduced the same quantity of a diluting liquid, for example 0.33 ml. of distilled water or 0.33 ml. of molten gelose.

(3) Into each of the receptacles 1 there is then introduced a suspension of bacteria in distilled water, the volume introduced being 0.05 ml.;

(4) After several hours of incubation at a given temperature (37°) the turbidity in each of the two parts of the device is recorded, either with the naked eye by referring to a turbidity scale, or with the aid of a recording turbidity meter.

(5) The results obtained are compared with previously obtained results, either with the aid of classification keys or by mathematical treatment of the information on a computer.

(6) Additionally, the effects of the bacterial growth on the chemicals are studied with the aid of reagents or, after separation from the culture medium, by chemical or physical titration, or by gas phase chromatography.

First example of application of the device

It is desired to study the respiratory pattern of a bacterium.

The material used contains as chemical product peptone of meat in solution at 0.15% in polyacrylamide at 1% in distilled water.

These chemical products are placed on the base of the cup and on the base of the tube and dried.

At the time of use, the tube and cup are filled with sterile distilled water, and a small quantity of a light suspension of the bacteria to be studied is added thereto. It is equally possible, for greater simplicity, to put the suspension of bacteria in the distilled water and to fill the tube 3 and cup 2 with the mixture.

At the time of reading, the opacity, due to the development of the bacteria in the tube and in the cup, is noted.

The respiratory physiology of the bacteria is deduced from this:

The strictly aerobic bacteria develope only in the cup.

The aeroanaerobic bacteria develope in the cup and in the tube.

The anaerobic bacteria develope only in the tube.

Second example, strictly aerobic culture

The device ready for use includes sodium citrate as a source of carbon and a source of mineral nitrogen included in polyvinyl alcohol; the combination is dried.

At the time of use, the device is filled with gelose or galactan 15% melted. After gelation, a drop of suspension of the bacteria to be studied is added. If developement takes place, an opaque layer forms on the surface of the gelose in the cup. Using the same device with a liquid medium, the bacteria are able to develope or not in the tube and in the cup.

It can be shown that certain species of bacteria can ferment the sodium citrate anaerobically in the tube and aerobically oxidise it in the cup; other species only oxidise it. The same device permits both observations simultaneously.

Third example, strictly anaerobic culture

For these anaerobic bacteria atmospheric oxygen is toxic. The cultures are prepared under nitrogen, carbon dioxide or inert gas; they are sampled by syringe.

The active chemical product is disposed exclusively on the base of the tube.

The device is filled with sterile liquid paraffin so that the tube is full.

Distilled water, de-aerated by boiling, is introduced into the tube with the aid of a syringe. The water, being heavier than the liquid paraffin, occupies all the available volume in the tube and pushes the liquid paraffin into the cup.

The paraffin closes the orifice of the tube and maintains perfect anaerobic conditions therein. The bacteria to be studied are then introduced with the aid of a needle mounted on a syringe, this process avoiding the use of special incubators for strictly anaerobic conditions.

The measurement of the turbidity of the culture medium can be advantageously effected by an optical path, using a light beam traversing the solution or reflected from the surface of the solution and falling on a light meter.

In the case where coloured reagents are used to control the reaction, the light beam may be monochromatic or bichromatic.

I claim:

1. Receptacle for studying the physiology and growth of selected bacteria under both aerobic and anaerobic conditions in a transparent container or receptacle therefor, said receptacle including a first part, a second, closed part and a protruding member in an opening between said first part and the second part, the first part forming a cup open to the surrounding atmosphere and the second, closed part comprising two parallel horizontal flat faces including a base common with the base of the first part, and an upper face, the upper face spaced away from and lower than the uppermost opening of the cup, the second closed part communicating with the first part by said opening situated at the base of the first part such that when a predetermined quantity of liquid sufficient to fill the second part completely and the first part to a higher level than the second part is introduced into the first part, the liquid travels to the second part past said protruding member, through the opening at the base of the first part and fills the second part, thereby sealing the liquid in the second part from the surrounding atmosphere while the liquid in the first part remains exposed thereto, said opening having said protruding member partially separating the first part and the second part and spaced in the opening so as to allow the opening to extend at least from the base to at least a portion of the upper face of the second part.

2. Receptacle according to claim 1 adapted to contain small volumes such that the total volume of the receptacle is less than about 1 cubic centimeter.

3. A plurality of identical receptacles as claimed in claim 1 associated by means of a common support.

4. Receptacle according to claim 1 consisting essentially of a substantially transparent thermoplastic material.

References Cited

UNITED STATES PATENTS 1,863,297   6/1932   Comer _____ 195—127
1,834,536   12/1931  Schaut _____ 195—139 LE

OTHER REFERENCES

Stapert et al., "Tech. Bull. Reg. Med. Tech." 32 (5): 89–90 (1962).

Wilson, "Proc. Soc. Exptl. Biol, and Med.," 75:515–517 (1950).

LIONEL M. SHAPIRO, Primary Examiner

M. D. HENSLEY, Assistant Examiner

U.S. Cl. X.R.

195—127